(12) United States Patent
Wilson

(10) Patent No.: US 7,717,068 B2
(45) Date of Patent: May 18, 2010

(54) APPARATUS FOR ENABLING A TRAINED DOG TO OPEN A DOOR

(76) Inventor: Laura Wilson, 1808 Lena St., Mena, AR (US) 71953

( * ) Notice: Subject to any disclaimer, the term of this patent is extended or adjusted under 35 U.S.C. 154(b) by 939 days.

(21) Appl. No.: 10/921,245

(22) Filed: Aug. 19, 2004

(65) Prior Publication Data

US 2006/0037558 A1      Feb. 23, 2006

(51) Int. Cl.
*A01K 29/00*     (2006.01)
*E06B 7/28*      (2006.01)

(52) U.S. Cl. .................. 119/712; 119/174; 16/412; 16/901

(58) Field of Classification Search ............ 292/255; 49/161, 162, 263; 16/412, 901; 119/174
See application file for complete search history.

(56) References Cited

U.S. PATENT DOCUMENTS

| | | | | |
|---|---|---|---|---|
| 283,770 | A * | 8/1883 | Geiger | 292/255 |
| 533,571 | A * | 2/1895 | Tower | 49/263 |
| 842,081 | A * | 1/1907 | Clark | 16/412 |
| 1,084,830 | A * | 1/1914 | Tate et al. | 292/255 |
| 1,337,384 | A * | 4/1920 | Allen | 16/412 |
| 1,583,818 | A * | 5/1926 | White | 292/171 |
| 2,120,534 | A * | 6/1938 | Wild | 292/255 |
| 3,156,944 | A * | 11/1964 | Bohn | 16/412 |
| 3,391,674 | A * | 7/1968 | Burleigh | 119/174 |
| 3,874,118 | A * | 4/1975 | Robinson | 49/402 |
| 4,095,372 | A * | 6/1978 | Rittner | 49/460 |
| 4,400,696 | A * | 8/1983 | Klingensmith | 340/573.3 |
| 4,621,848 | A * | 11/1986 | Pierce | 292/336.3 |
| 4,710,634 | A * | 12/1987 | Brookes | 250/455.11 |
| 5,193,863 | A * | 3/1993 | McBain | 292/255 |
| 5,309,602 | A * | 5/1994 | Von Holten | 16/412 |
| 6,067,690 | A * | 5/2000 | Herman | 16/412 |
| 6,189,183 | B1 * | 2/2001 | Hartselle, III | 16/412 |
| 6,382,750 | B1 * | 5/2002 | King | 312/319.9 |

* cited by examiner

*Primary Examiner*—B C Hayes
(74) *Attorney, Agent, or Firm*—Nirmel & Associates; Chittaranjan N. Nirmel

(57) ABSTRACT

A paw-supporting element, mountable to a hinged door at a suitable location, enables a dog easily to either pull or push the door open depending on which way the door is operable. A pivotable plate mounted above the paw-supporting element, linked to a liftable latch of the door if one is provided, enables the dog to also unlatch the door to open the same.

5 Claims, 3 Drawing Sheets

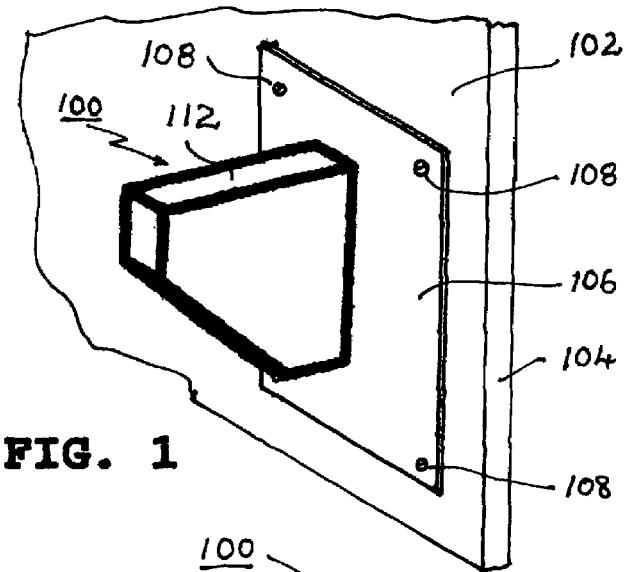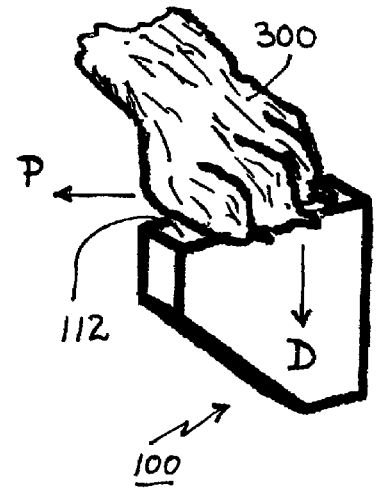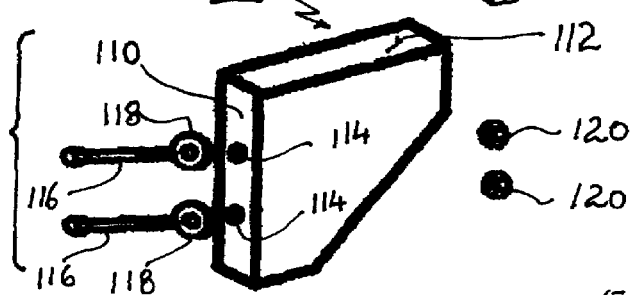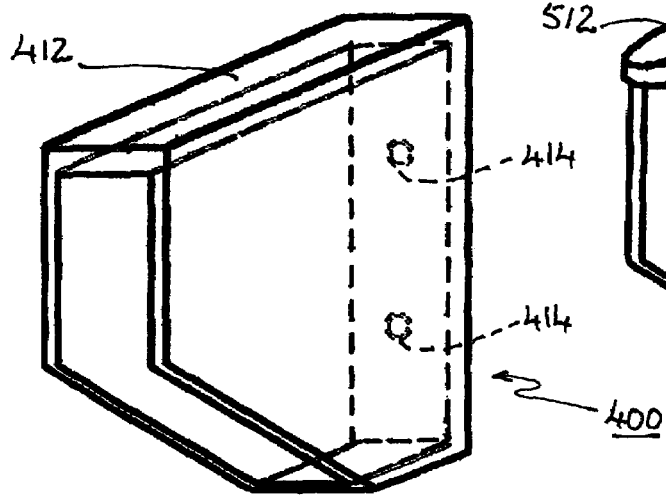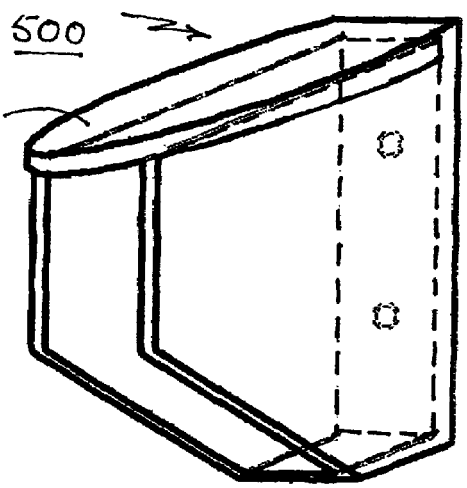
FIG. 1
FIG. 3
FIG. 2
FIG. 4
FIG. 5

US 7,717,068 B2

APPARATUS FOR ENABLING A TRAINED DOG TO OPEN A DOOR

TECHNICAL FIELD OF THE INVENTION

This invention relates to an apparatus and a method for enabling a trained dog to open a hinged door either volitionally or upon command. More particularly, it relates to an apparatus that can be mounted to either or both sides of a door at a location suitable for a particular dog so that the dog upon receiving related training can open the door for it's own purpose or upon command to serve a person.

BACKGROUND OF THE RELATED ART

Dogs can be trained to live with humans in mutual comfort. Many dogs are trained to provide particular services, e.g., to sniff out drugs or cadavers, to track, to rescue people in distress, to guide the blind, etc. More often, dogs are owned as pets and provide both companionship and safety. In this latter role, they will typically share their owner's abode and know from an early age that doors can be opened to enable exit and entry. To get through a hinged door, dogs will typically try to push against the door with their snouts if the door is one that opens outward and away from them or will paw the door to try to pull it towards them if it is one that opens inward. This latter practice, which is the result of instinct rather than training, generally results in the door getting scratched and scarred over time. If the door in question is a screen door the damage may be serious enough to defeat the very purpose of the door, i.e., to keep out insects. It is also frustrating and fruitless for the dog—and may lead to undesirable barking.

There is clearly an unmet need for a safe, simple, affordable and easily installed apparatus and a method that will enable a reasonably intelligent dog, with a little training, to operate a hinged door that opens inward or outward—especially one that is spring-biased to be in a closed position and may even have a simple latch to hold it closed. The present invention addresses this need for the dog when it wants to get through the door for it's own purposes. Perhaps more importantly for a weak, injured or handicapped person, It also enables a trained dog to open the door at that person's command.

SUMMARY OF THE INVENTION

Accordingly, it is a principal object of the present invention to provide an apparatus mountable to a normally closed hinged door to enable a dog to open the door by selectively either pulling it towards itself or by pushing it away, depending on which way the door is operable. The apparatus, in a preferred embodiment, comprises a paw-supporting element and means for attaching the same at a predetermined location on a hinged door adjacent a distal side of the door that is opposite the door hinge.

In another preferred embodiment, particularly suitable for use with a door that has a liftable latch normally holding the door in a closed position, the apparatus comprises a paw-supporting element, a latch-actuating linkage intermediate the paw-supporting element and the liftable latch, and means for attaching the paw-supporting element to the door at a predetermined location adjacent a distal side of the door that is opposite the door hinge.

In another aspect of this invention, there is provided a method for enabling a trained dog to open a normally closed hinged door by selectively pulling the door towards itself or by pushing it away, depending on which way the door is operable. The method comprises the step of mounting a paw-supporting element to the door at a location suitable for the dog to forcibly press a front paw downward on the paw-supporting element and simultaneously pull or push on the paw-supporting element to thereby open the door.

In a further embodiment of this invention, there is provided a method for enabling a trained dog to open a hinged door that is normally held in a closed position by a liftable latch, by actuating the latch open and selectively pulling the door towards itself or by pushing it away depending on which way the door is operable. The method comprises the steps of mounting, to a hinged door provided with a liftable latch, a paw-supporting element at a location suitable for the dog; and mounting to the door a latch-actuating linkage intermediate the paw-supporting element and the liftable latch, thereby enabling the dog to press downward on a portion of the linkage to actuate the latch open and to simultaneously press downward on the paw-supporting element while pulling or pushing on the door to open the same.

These and other related and further aspects of this invention are best understood with reference to the following detailed description and drawing.

BRIEF DESCRIPTION OF THE DRAWING

FIG. 1 is a perspective view of the first preferred embodiment of this invention.

FIG. 2 is an exploded partial perspective view of the first preferred embodiment to identify elements for attaching the invention to a door.

FIG. 3 is a partial perspective view of a dog's paw in operating position on the first preferred embodiment of this invention as the paw would be applied by the dog to open the attached door.

FIGS. 4-9 are perspective views of the second through seventh preferred embodiments, respectively.

DETAILED DESCRIPTION OF THE PREFERRED EMBODIMENTS

Figure 6:
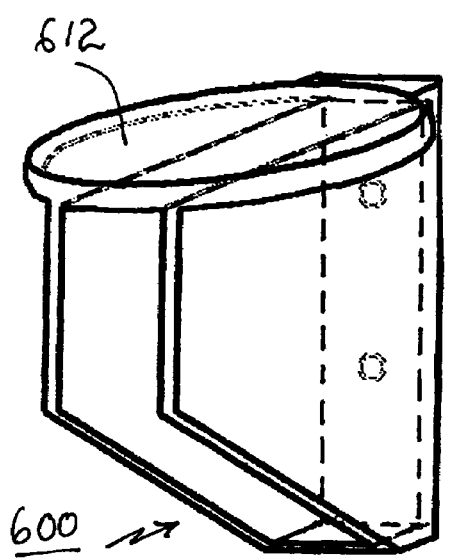

The typical hinged door pivots about a vertical hinge axis, between a "closed" position defined snugly within a door frame and a fully "open" position up to 180 degrees of rotation away. Some doors are double-hinged, and can pivot open in both rotational directions relative to the door frame. Although the following discussion focuses on the former kind, persons of ordinary skill in the mechanical arts will find it obvious to readily adapt the present invention to function even with a double-hinged door.

FIG. 1, in perspective view, shows a paw-supporting element 100 according to the first preferred embodiment as mounted to an outside surface 102 near the bottom left corner of a typical door 104 hinged on it's right hand side. Although paw-supporting element 100 may be mounted directly to the door, it is shown as mounted over an optional protective plate 106 that may be mounted to the door by a plurality of screws 108. In the event that an excited or inexperienced dog misses paw-supporting element 100, protective plate 106 should significantly reduce scratching of door surface 102.

Paw-supporting element 100 is preferably solid and shaped like a rectangle that has one corner cut off. It has a vertical rear surface 110 (best seen in FIG. 2) that abuts door surface 102 (or protective plate 106 if one is utilized). It also has an upper, horizontal, non-slip surface 112 upon which the dog must place its paw to forcibly pivot the door. Paw-supporting element 100 is formed to have through holes 114, 114 through which may be passed corresponding bolts 116, 116 employed in obvious manner with washers 118,118 and nuts 120, 120 to strongly affix the same to the door. Paw-supporting element 100, for economy and durability, may readily be made of wood. Protective plate 106 may be made of a strong abrasion-resistant plastic or metal. The choice of any of these materials is not limited.

As best understood with reference to FIG. 3, a dog using the first embodiment must be trained to place a front paw 300 directly on upper surface 112 of paw-supporting element 100, exert a downward force as indicated by arrow "D", and simultaneously exert a horizontal pulling force as indicated by arrow "P". Considering FIGS. 1 and 3 together, it is seen that for a door hinged at it's left side the dog would have to be at it's bottom right corner to pivot it open. The dog would find it most convenient to use its front left paw as described above. Even if the door is provided with a spring (not shown for simplicity since such devices are commonplace) that acts to bias it towards a closed position, a reasonably sized dog should be able to pull the door outward to open it. The dog will then instinctively advance it's snout into the opening it has so created, push it's shoulders forward, follow with the rest of it's body, and thus obtain entry past the door. The dog's entry would be further facilitated if the door is also provided with a damper mechanism that slows down the rate at which the biasing spring can close the door shut. Quite frequently, the biasing spring and the damper mechanism are commercially available as a single unit.

As is obvious, similar apparatus can be mounted on the other side of the door, directly opposite to the described one, if the door is of the kind that can be swung open both ways. Even if the door can open only in one direction, provision of a second paw-supporting element and a protective plate on the inward side of the door should facilitate egress of the dog while protecting the door on the inside.

A user of the invention may prefer to use an embodiment made from a strong plastics material with a choice of shapes and/or colors to match or coordinate with the color and design features of the door. The simplest such alternative, according to the second preferred embodiment 400, is shown in FIG. 4. It is substantially hollow and may be made by any known process, e.g., heat molding. It has the same general outer shape as the first embodiment 100, and may be employed with a protective plate as previously described—with affixation bolts passed through holes 414, 414. Upper surface 412, on which the dog's paw is to be supported in non-slip manner, may be formed to have a slightly rough texture.

FIG. 5 shows a third preferred embodiment 500, which differs from embodiment 400 only in the oval shape of upper surface 512. Such an oval shape is wider at it's widest part than counterpart rectangular surface 412, and might be more suitable for a nervous or older dog that lacks the strength and/or coordination of a strong young animal.

FIG. 6 shows a fourth preferred embodiment 600 that has a circular upper surface 612 but is otherwise largely similar to the second and third embodiments.

Figure 7:
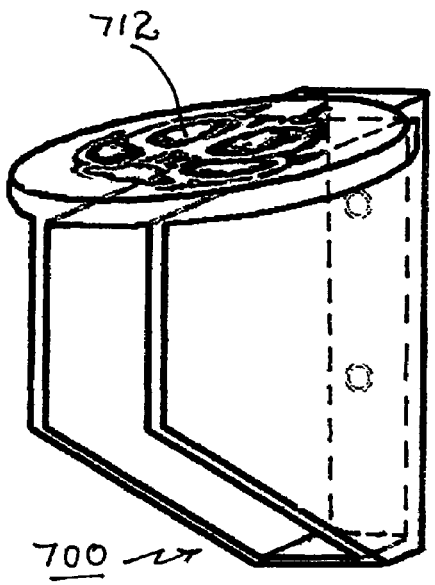

FIG. 7 shows a fifth preferred embodiment which differs from the immediately preceding embodiment in having an upper surface 712 provided with a topography like that of a paw print in sand. A textured, non-slip surface is helpful regardless of the shape of the upper surface, e.g., 412, 512, 612 or 712, but the addition of shallow recessed portions corresponding to the dogs paw-pads may make it easier for the dog to obtain purchase on the upper surface of the paw-supporting element to pull the door open. This may be a distinct advantage during wet weather or when the dog has walked in something slippery, e.g., mud.

Figure 8:
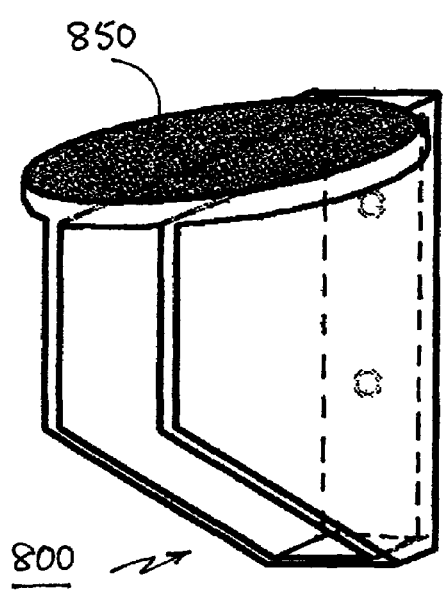
Figure 9:
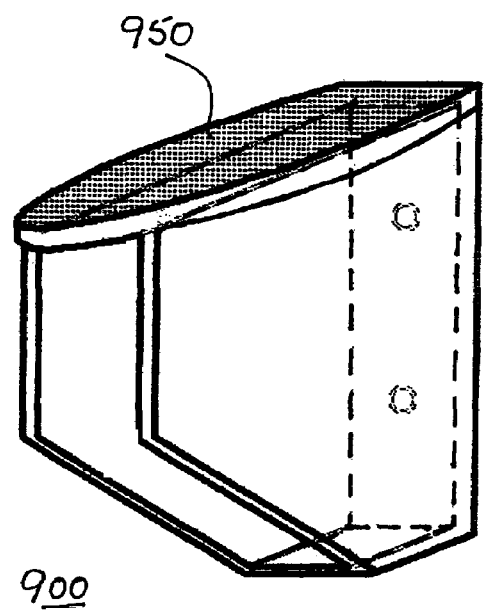

FIG. 8 shows a variation 800 of fourth embodiment 400, wherein a non-slip layer such as a shaped piece 850 made of carpeting, matting, rubber sheeting or the like, is adhered to ease the dog's task by deliberately providing and/or enhancing friction where the dog's paw is to be applied in use. Similarly, FIG. 9 shows a variation 900 of third embodiment 300, wherein a deliberately uneven upper surface 950 is provided to minimize slippage of the dog's paw. Other obvious variations on these themes will no doubt occur to persons of ordinary skill in the mechanical arts.

As noted earlier, the door may have a liftable latch of the kind frequently found on screen doors. Such latches are easily actuated by a simple lifting action from their "door closed" position to allow the thus disengaged door to pivot about a vertical hinge. Such a latch is typically mounted to the door about 3½ feet above the bottom edge—probably somewhere between 2 and 2½ feet above the optimum location of the various embodiments of this invention as described above. As explained below, it is easy to adapt the invention to permit the dog to open such a latch while either pulling or pushing the door open. The dimensions of the door opener apparatus and latch elements, and the location at which they are mounted on a door, are matters of choice for the user and should be selected to suit both the user and the dog for which the apparatus is being provided.

Figures 10, 11:
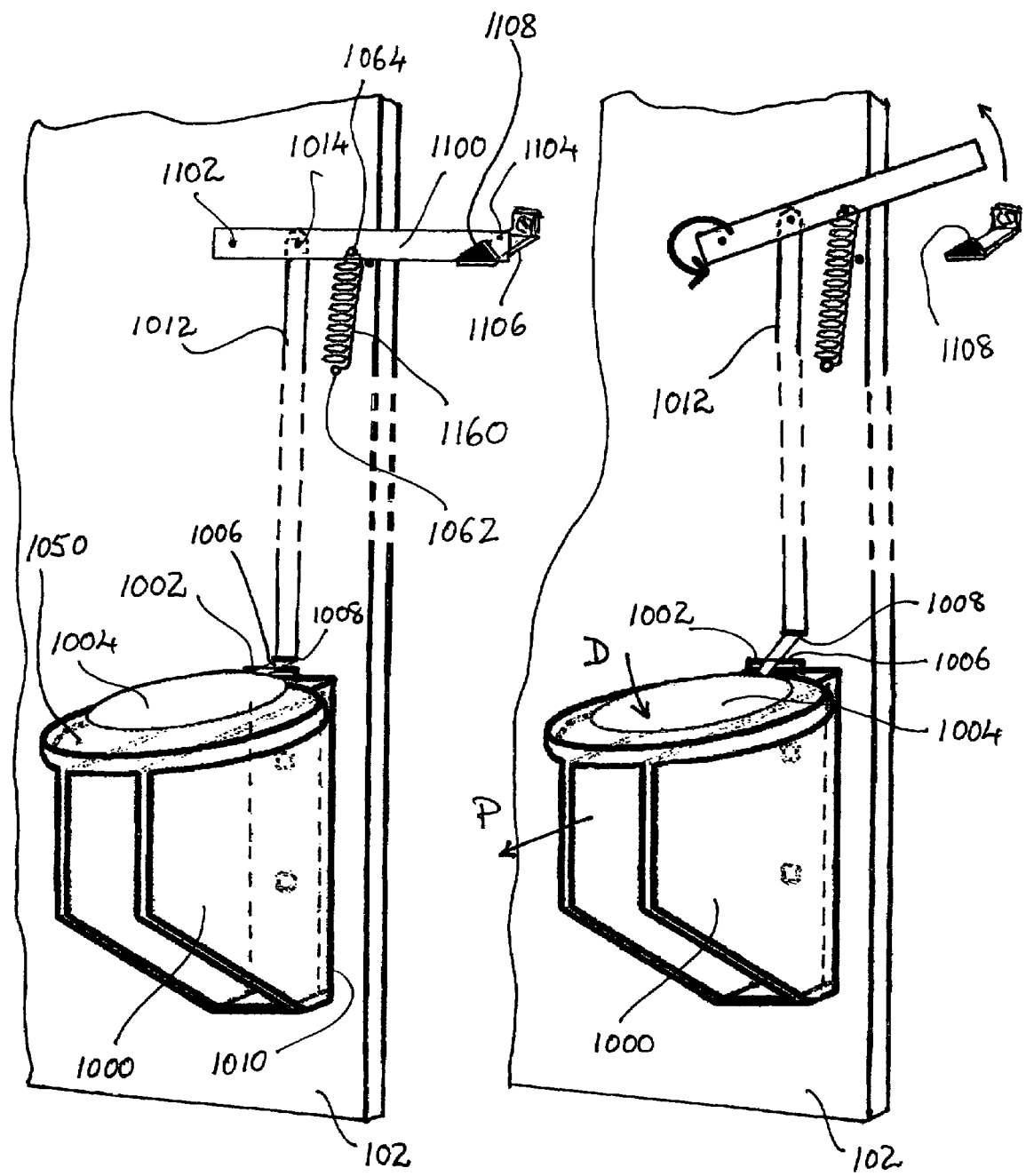
FIGS. 10 and 11 are perspective views of the eighth preferred embodiment in it's latched (i.e., "door closed), and unlatched (i.e., "door open) positions, respectively.

As best seen in FIGS. 10 and 11, exemplary paw-supporting element 1000 of this invention differs from embodiment 600 in that it is provided with a horizontal pivot bar 1002 located close to the vertical surface 1010 that abuts door surface 102. Also provided is a plate 1004, having an extension 1006, that is pivotably supported by pivot bar 1002 so that plate 1004 pivots just above upper surface 1050. The distal end of extension 1006 is provided with a horizontal hinge 1008 by which it engages with the lower end of a pushbar 1012. The upper end 1014 of pushbar 1012 is pinned by a pin 1014 to latchbar 1100 at a location intermediate the latter's end portions. Latchbar 1100 is pivotably supported adjacent one end by a pivot pin 1102 mounted directly or indirectly to door surface 102, and thus has its distal end portion liftable to be movably engaged with latch element 1106 that has an upturned end 1108 and is supported to the door frame (not shown).

As shown in FIG. 10, latchbar 1100 has been pulled down relative to pivot pin 1102 by a tension-applying spring 1160 that is engaged at one end 1062 to door surface 102 and at an opposite end 1064 to latchbar 1100. End 1064 of spring 1160 is on the opposite side of pin 1014 relative to pivot pin 1102, whereby the spring tension tends to pivot latchbar clockwise, i.e., to it's engaged position. The tension force provided by spring 1160 must be sufficient to counter and overcome the weight of plate 1004 at rest, i.e., so that the forward edge portion of plate 1004 is normally lifted a short distance above upper surface 1050.

With this arrangement, when a dog places his or her paw on top of plate 1004 the pivoting motion of plate 1004 about horizontal hinge 1008 will cause pushbar 1012 to move against the force of spring 1160 and lift the distal end of latchbar out of it's engaged position. This is best seen in FIG. 11. When the dog exerts a pulling force on the unlatched door it should be able to open the door and proceed through as desired. Note that the downward force of the dog's paw is immediately and almost entirely transmitted to the paw-supporting element via horizontal pivot bar 1008 and possible contact between the front of plate 1004 and upper surface 1050. The upper surface of plate 1004 may advantageously be provided with a textured surface or other form of friction enhancement to minimize slippage by the dog's paw applied thereon.

Selection of the exact dimensions of the described elements is obviously a matter of design choice, and the manufacturer can be expected to make and market the apparatus in a variety of sizes to cater to the needs of dogs of different physiognomies.

The present invention should be very valuable to elderly, weak or handicapped owners of adequately trained dogs that will obey a command to open the door wide after it has been opened and will then hold it wide open. Thus such a person could order the dog to open the door, have the dog hold it wide open, and slowly walk through the door or navigate a wheelchair past the dog. As noted earlier, the apparatus can be operated by a trained dog either to unlatch and push a door open or to unlatch and pull the door open as appropriate. This should facilitate both entry and exit through a door leading, for example, to a porch, balcony or enclosed yard, without compromising the dog owner's security. Elderly persons who must use a walker, for example, who otherwise would find it extremely difficult to negotiate spring-loaded and/or latched doors, can thus pass back and forth through such doors with use of this invention when aided by their trained service dogs. There are many organizations, readily found on the internet, that train dogs to perform such services.

All obvious variations and modifications of the invention as disclosed herein are intended to be comprehended within the invention which is limited solely by the claims appended below.

What is claimed is:

1. An apparatus for enabling a dog to open a door, by selectively either pulling the door toward itself or by pushing the door away depending on which way the door is operable, comprising:
   a paw-supporting element formed to be affixable directly to the door at a selected location thereon; and
   means for affixing the paw-supporting element directly to the door,
   wherein
      the paw-supporting element is provided with an upper surface formed to resist slippage relative to a dog's paw forcibly applied thereto to exert a horizontal pulling force to open the door, and
      the upper surface is provided the topography of a paw impression.

2. The apparatus according to claim 1, further comprising:
a protective element positioned between the door and the paw-supporting element.

3. The apparatus according to claim 2, wherein:
the paw-supporting element and the protective element each respectively comprises a material selected from a group of durable materials consisting of wood, metal and plastics.

4. The apparatus according to claim 1, wherein:
the upper surface is textured to resist slippage of the dog's paw applied thereto during use.

5. The apparatus according to claim 1, further comprising:
a friction-providing element applied to the upper surface.

* * * * *